Sept. 14, 1948.  G. W. EYPPER  2,449,464

CORD ADJUSTING AND STORAGE DEVICE

Filed Oct. 8, 1947

INVENTOR.
George W. Eypper,
BY James G. Bethell
ATTORNEY

Patented Sept. 14, 1948

2,449,464

UNITED STATES PATENT OFFICE 2,449,464

CORD ADJUSTING AND STORAGE DEVICE

George W. Eypper, Montclair, N. J.

Application October 8, 1947, Serial No. 778,523

3 Claims. (Cl. 24—71.2)

My invention relates to cord adjusting and storage devices, particularly useful for shortening and lengthening electric cords, wires, etc.

My device is small and compact for its capacity, simple in construction and operation and adapted for both industrial and domestic uses.

More specifically my invention provides a cord-adjusting and storage device wherein the excess cord is readily housed in the device by rotating one section of the device relatively to another thereby to shorten the cord; and when the cord is to be lengthened it is necessary merely to pull upon two sections of the cord in opposite directions.

My device is useful in industry to avoid accident to personnel and injury to equipment, in that excess cord is kept out of the way yet is instantly available.

My device is also well adapted for domestic use for the storage of the excess cord of toasters, grills, percolators and other domestic appliances, the construction being such that when it is desired to lengthen the cord of these appliances it is merely necessary to move the appliance away from the outlet.

In the accompanying drawings wherein I have illustrated an embodiment of my invention, Fig. 1 shows my device in perspective;

Figure 1:
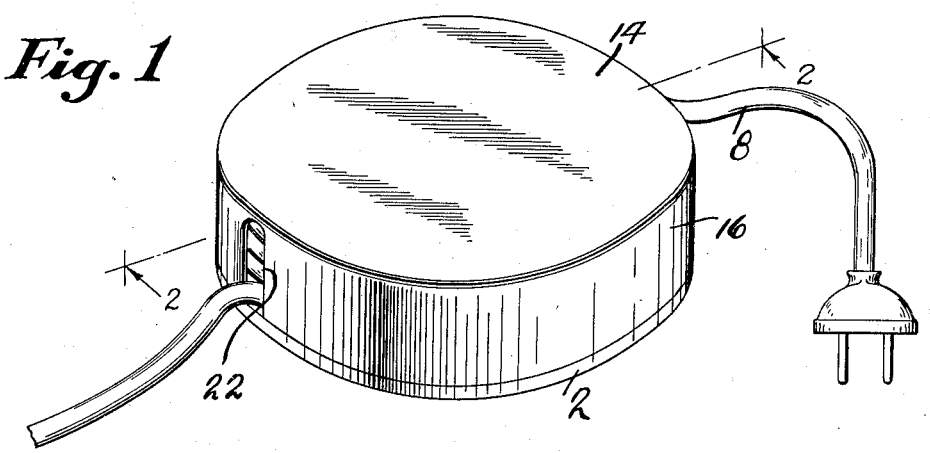

Referring to the drawings in detail, my device provides a cord storage spool comprising an end flange or disc 2 which is preferably circular in plan.

Figure 3:
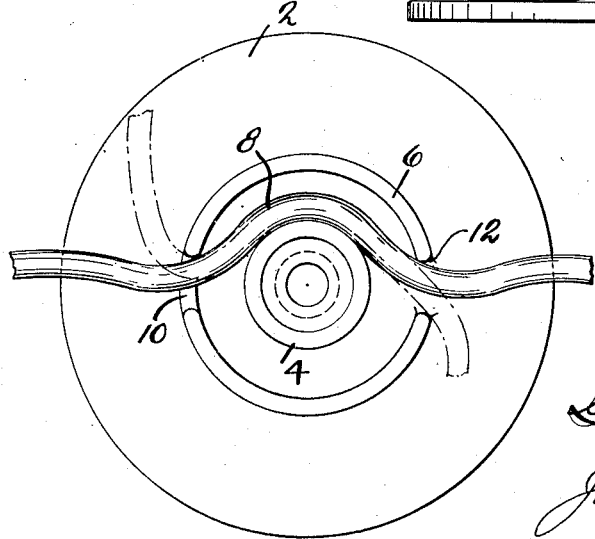
Fig. 3 is a plan view of the lower or base member of my improved device.

The member 2 which constitutes the bottom or base of the device is provided on its inner face with a central hollow boss 4 and a concentric tubular member 6. These two elements are perpendicular to the disc and are spaced apart sufficiently as illustrated in Fig. 3 to permit a length of the cord 8 to be inserted between them.

The disc or end member 2, the boss 4 and tubular member 6 may be made of moulded material, the construction being such as to facilitate moulding. These elements, therefore, have been shown integral with each other. It is to be understood of course that these three elements are not necessarily integral nor of plastic material, but such construction from a commercial point of view is preferred, in that it lessens the cost of manufacture and at the same time provides an article of good appearance.

The tubular member 6 is provided with two open-ended slots 10 and 12. These slots are spaced apart peripherally of the member 6, preferably diametrically opposite to each other. As will be seen from Fig. 2, the slots are open at their upper ends, and the slot 10 terminates a substantial distance above the terminal end of the slot 12. The purpose of this construction will be explained later.

Inasmuch as the cord 8 extends entirely across the device and projects beyond the sides thereof, and inasmuch as in use the cord is drawn through the slots 10 and 12, the sides of both slots as well as the bottom or terminal end of the slot 10 are rounded off so as to eliminate abrasion of the surface of the cord.

The device is provided with a cover, comprising an end member 14 having a peripheral flange 16 constituting the side walls of the cover. Disposed at the center of the inner face of the cover end member 14 is a boss 18. This boss is vertically disposed with respect to the end member and is of such dimensions as to fit within the hollow boss 4, which therefore functions as a bearing, whereby the two parts, namely the cover and the base member 2 may be rotated relatively. These two parts are secured to each other by a threaded member 20.

The peripheral flange 16 of the cover is provided with open ended slots 22 and 24. These slots are open at the edge of the flange 16 and extend toward the cap member 14, the slot 24 terminating a substantial distance short of the terminal of the slot 22. Preferably these slots are spaced the same distance apart as the slots 10 and 12.

Figure 2:
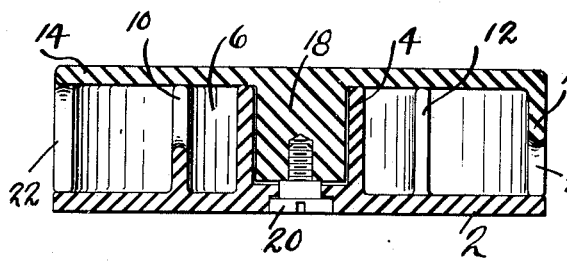
Fig. 2 is a section on the line 2—2 of Fig. 1.
Figure 4:
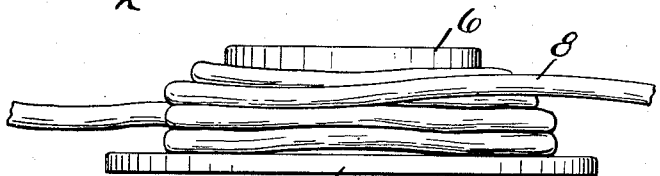
Fig. 4 is an elevational view of the same member showing the cord wound thereon.

In operation the cover member is removed and the cord 8 is laid across the top of the tubular member 6 and pushed downwardly into the slots 10 and 12 as illustrated in Fig. 3 and into the space between the boss 4 and member 6. The cover is then placed in position as shown in Fig. 2 with the long slot 22 preferably abreast of the short slot 10, and the short slot 24 abreast of the long slot 12.

The screw 20 is then placed in position.

The cord 8 is now fully extended. When it is desired to shorten the same it is merely necessary to rotate the disc 2 and cover relatively, the short slot 24 at one side of the tubular member 6 bending the cord 8 about the tubular member in one direction at the slot 12 while the slot 22 at the same time is bending the cord 8 about the tubular member in the opposite direction. Continued relative rotation of the cover and disc draws additional cord into the device, the cord wrapping about the tubular member 6 to be stored between it and the peripheral flange 16 of the cover.

By disposing the cover initially as just described relatively to the slots 10 and 12 it will be apparent that the cord taken up through the cover slot 24 will be wrapped about the tubular member 6 below the cord taken up through the cover slot 22. While the device is operable when the cover is positional with its slot 24 abreast of the slot 10, the capacity of the device is greater when the cover is initially positioned with slot 24 abreast of slot 12.

To lengthen the cord at any time it is merely necessary to pull outwardly on the cord projecting from the device at the cover slots. If the cord is the cord of a floor lamp for example, and the end of the cord is plugged into an outlet, it is merely necessary to move the lamp away from the outlet.

From all of the foregoing it will be seen that I have provided an exceedingly simple and relatively inexpensive device for varying the length of electric cords and wires, the excess cord being stored out of the way when not in use.

It is to be understood that changes may be made in the details of construction and arrangement of parts shown and described without departure from the spirit and scope of my invention.

What I claim is:

1. In an article of the class described a cord-storage spool comprising in combination an end flange, a hollow boss on the inner face thereof extending axially of the spool, a tubular member on the inner face of said flange surrounding and spaced from said boss, spaced, cord-receiving slots in said tubular member, these slots being open-ended at the free end of the tubular member, a cover member having an integral peripheral flange constituting cover side walls, cord-receiving slots in said peripheral flange open-ended at the flange edge, a boss on the inner face of the cover member adapted to extend into the hollow boss of the spool whereby, with the cover boss inserted in the spool boss and a cord lying in said slots and projecting to the cover exterior, relative rotation of the spool and cover will draw the projecting portions of the cord into the cover and wrap the same about the tubular member of the spool.

2. In an article of the class described a cord-shortening and storage spool comprising in combination a bearing member extending axially of the spool, a plate carried by one end of the bearing member and extending transversely thereof, a tubular member carried by the plate and surrounding the bearing member, the tubular member being spaced sufficiently from the bearing member to permit of the insertion of a length of the cord to be stored therebetween, open-ended cord-receiving slots in the inner end of the tubular member, a cover comprising an end member and side walls, a member projecting from the inner face of the end member of the cover, said projecting member and the bearing member interfitting to provide for relative rotation of the cover and spool, and cord-receiving open-ended slots in the cover side walls, whereby with the cover and spool assembled with a cord lying in the slots of the tubular member and projecting through the cover slots relative rotation of the cover and spool will draw the cord into the cover through the cover slots simultaneously and wrap the same about the tubular member.

3. In an article of the class described a cord-storage spool comprising in combination an end flange forming the outer end of the spool, a boss on the inner face of the flange and extending axially of its spool, a tubular member on the inner face of the flange, said member being concentric with the boss and spaced therefrom sufficiently to receive a length of the cord to be stored, the upper edge of the tubular member being slotted axially to provide cord-receiving slots, one of said slots terminating a substantial distance below the bottom of the other slot, a cover comprising an end member and side walls, a boss on the inner face of the end member and cooperating with the first mentioned boss to permit relative rotation of the cover and spool, and slots in the side walls of the cover corresponding to the slots in the tubular member, whereby with the cover and spool assembled and a cord to be stored lying in said slots with the cord projecting beyond the cover through the cover slots, relative rotation of the spool and cover will cause the core to be wound upon the tubular member at different levels corresponding to the terminals of the slots in the tubular member.

GEORGE W. EYPPER.